Aug. 18, 1959 J. W. HAVSTAD 2,900,451

MAGNETIC TRANSDUCING APPARATUS

Filed Aug. 24, 1955 4 Sheets-Sheet 1

JAMES W. HAVSTAD
INVENTOR.

BY Flehr & Swain
ATTORNEYS

JAMES W. HAVSTAD
INVENTOR.

BY Flehr & Swain
ATTORNEYS

Aug. 18, 1959 J. W. HAVSTAD 2,900,451

MAGNETIC TRANSDUCING APPARATUS

Filed Aug. 24, 1955 4 Sheets-Sheet 3

JAMES W. HAVSTAD
INVENTOR.

BY Flehr & Swain

ATTORNEYS

JAMES W. HAVSTAD
INVENTOR.

BY Flehr & Swain
ATTORNEYS

1

2,900,451

MAGNETIC TRANSDUCING APPARATUS

James W. Havstad, Atherton, Calif., assignor to Ampex Corporation, Redwood City, Calif., a corporation of California Application August 24, 1955, Serial No. 530,334

5 Claims. (Cl. 179—100.2)

This invention relates generally to a magnetic transducing method and apparatus, and more particularly to a magnetic transducing method and apparatus for reproduction of a magnetic record.

In a magnetic recording, the signal to be recorded is applied to a recording head. Such heads comprise means for setting up a magnetic field which varies with the applied signal. When recording, the magnetic field links the recording medium and aligns the randomly oriented magnetic particles in the medium to give a remanent magnetism which, at any point, is proportional to the applied signal. The magnetic medium can be any material capable of being permanently magnetized to varying degrees. Recording mediums are of many types, for example, they may be in the form of wire, tape, coated tape, discs, cylinders, and the like.

In the playback process, the remanent magnetism generates a signal which is some function thereof. In general, this is accomplished by directing the magnetic flux through a coil, by means of a high permeability shunt, typically approximately C-shaped. The coil is wound about the body of the core and the tape crosses the opening. The width of the opening determines the shortest wavelength which may be reproduced, thereby determining the necessary tape speed for a given maximum frequency response. At present, wavelengths of the order of a few ten-thousandths of an inch are the shortest which may be reproduced. Inasmuch as this type of playback transducer is only sensitive to changes of magnetic flux, rather than to the magnetic flux, the output signal doubles with each doubling of frequency.

The high frequency response is limited further by magnetic losses in the core material, and by resonance of the inductance and capacitance of the coil and associated connectors and circuits.

It is a general object of the present invention to provide a magnetic reproducing apparatus which makes more practical the reproduction of a wide frequency range.

It is another object of the present invention to provide apparatus of the above character which depends upon the modulation of the conductivity of a semiconducting material by a magnetic field for the reproduction of the magnetic recording.

It is still a further object of the present invention to provide apparatus of the above character which depends upon the modulation of the conductivity of a semiconducting material by magnetic field which is accomplished by varying the concentration of current carriers (holes and electrons) in the region where the conductivity is measured.

These and other objects of the invention will appear more clearly from the following detailed description when taken in connection with the accompanying drawings.

Referring to the drawings.

2

Figure 2:
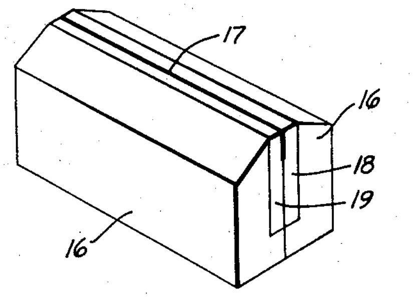
Figure 2 is a perspective view illustrating a reproducing head which incorporates the present invention.
Figure 3:
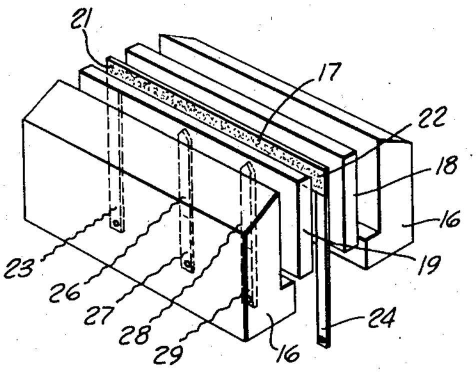
Figure 4A:
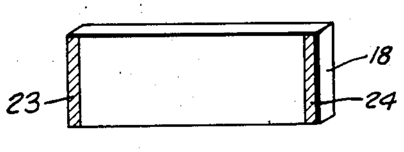
Figure 4B:
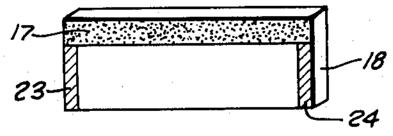
Figures 4C, 5:
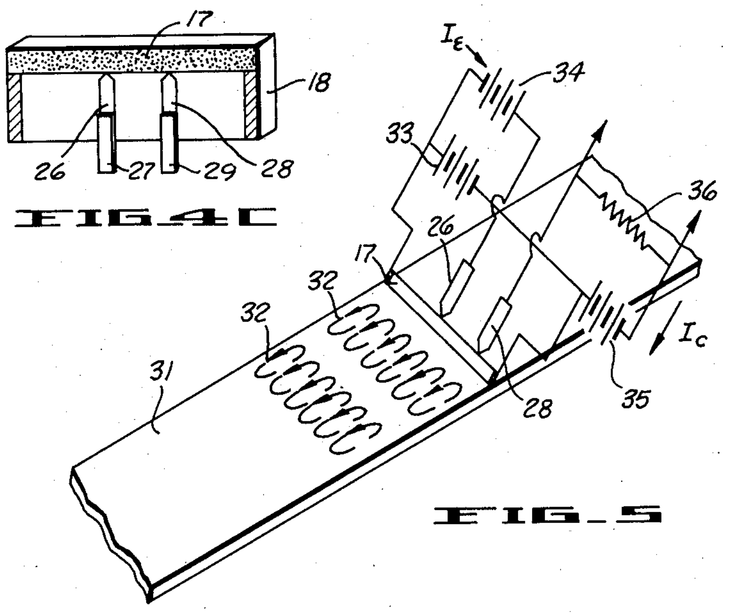

Figure 3 is an exploded view of the reproducing unit of Figure 2;

Figures 4A–4C are perspective views illustrating various stages in the manufacture of a reproducing head;

Figure 5 is a schematic view illustrating the reproducing head as used in conjunction with magnetic tape having longitudinal recording thereon;

Figures 6–15 show other circuit connections for reproducing heads which incorporate my invention.

An electric charge traversing a magnetic field will suffer lateral deflection. The axes of the field, motion of the charge, and deflection are mutually perpendicular. This deflection is observed best in media in which the path of the electrical charge is least interrupted by collisions. The best medium is obviously a vacuum. Among solids, the semiconductors are outstanding in this respect.

The deflection of electrons by magnetic field in a solid conductor generates a voltage gradient in the axis of the deflection. This is known as the Hall voltage, and the effect as the "Hall" effect. The Hall voltage acts against the magnetic field so as to oppose deflection of the electrons. Equilibrium is achieved with a nearly immeasurably small actual deflection. The concentration of current carries therefore remains unaltered.

If current carriers of the opposite sign are simultaneously moving in opposite directions, they will be deflected in the same direction by a suitably oriented magnetic field. No Hall voltage opposing this deflection will be generated if the oppositely charged carriers are present in equal number. Concentration of the carriers in one area of the conductor will result. In semiconductors the conductivity is directly proportional to the concentration of carriers so the measurement of the modulation of conductivity may be used to detect magnetic fields. The use of a semiconductor, into which minority carriers are injected for the demonstration of this effect is an example of the Suhl effect, and is described in Electrons and Holes in Semiconductors by Shockley, D. Van Nostrand & Co., Inc., 1950.

Figure 1A:
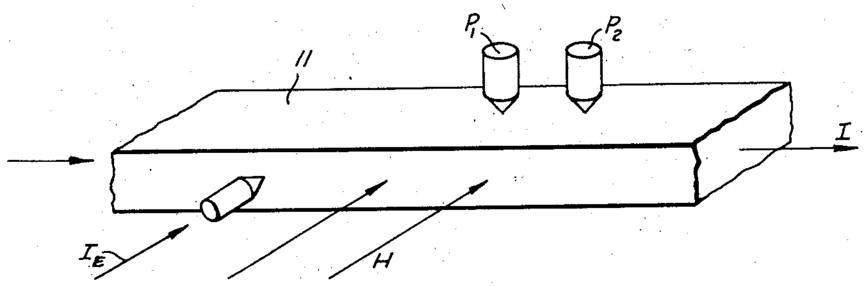
Figures 1A–1C illustrate the magnetic concentration of holes and electrons.
Figure 1B:
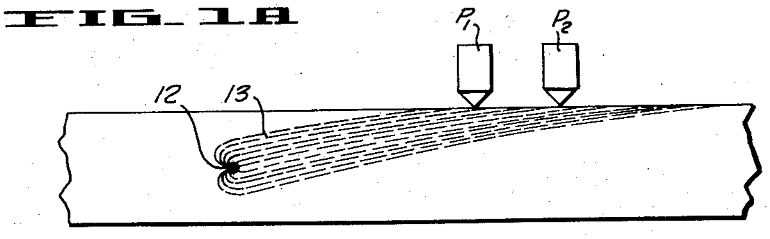
Figure 1C:
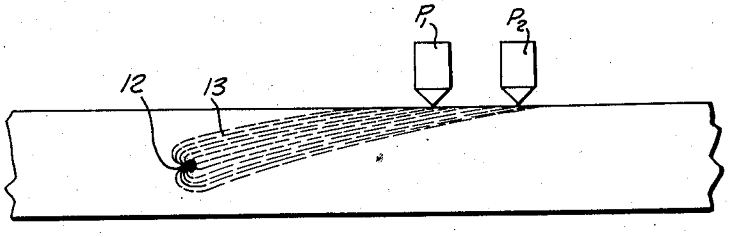

Referring particularly to Figures 1A–1C an emitter 12 is shown injecting holes into the semiconductor. The hole path is shown by the dotted lines 13. The magnetic field in Figure 1C is stronger than that in Figure 1B. The holes undergo greater concentration in the latter case. The conductivity between points P1 and P2 is a direct measure of the concentration of the carriers (holes and electrons) resulting from a given magnetic field intensity.

In accordance with my invention I employ a thin filament of semiconductor material which exhibits the "Suhl" effect. This film is mounted in such a manner that one edge is presented to the magnetic record. Ohmic connections are made to the ends of the filament and a longitudinal electric field is applied. An emitter connection is made to one side of the filament. At least one probe is connected in a circuit which responds to the changes in concentration of holes in the surface of the filament adjacent the probe. The probe is associated with electronic means which produce a signal which corresponds to the recorded signal.

The reproducing device illustrated in Figure 2 consists of a body 16 which can be formed of suitable molded plastic material, and which carries the filament 17. The filament 17 is mounted between dielectric wafers 18 and 19, which, for example, may consist of glass or other suitable dielectric material. One of the dielectric wafers serves to mount the filament and the connections thereto.

Referring particularly to Figure 3, an exploded view of a transducing device of the type shown in Figure 2 is shown. The filament 17 is provided with ohmic connections 21 and 22 disposed at its ends. Suitable leads 23 and 24 extend to the back of the transducing head and provide means for applying a longitudinal voltage. An emitter 26, which, for example, may be a point contact emitter, bears against the edge of the filament. The emitter is connected to a suitable lead 27 which extends to the back of the transducing head. A second contact which may comprise a probe point or a collector 28 also bears against the edge of the filament. A suitable lead is attached which extends to the back of the transducing device.

One manner in which the filament 17 with the associated connections may be formed on one of the plates, for example, plate 18, is shown in Figures 4A–4C. The conductors 23 and 24 may be applied to the edges of the plate 18. For example, the conductors 23 and 24 may be applied by well known methods of metal vaporization. A thin piece of semiconductor is cemented to the dielectric plate 18, the end portions thereof, making ohmic contacts with the leads 23 and 24. The semiconductor is ground to the desired thickness. The undesired portions are then removed, as for example, by sandblasting while desired portions are protected by suitable jigs. After sandblasting, the surface of the germanium is etched. The ends of the filament may be left wide to facilitate the ohmic connection with the leads 23 and 24. The emitter 26 and probe connections are then made. The leads 27 and 29 may then be applied, by metal vaporization, for example. The second dielectric plate 19 (Figure 3) is then connected to the first and the plastic is molded about the transducer to form the transducing unit.

Although I have described a particular method for forming a thin filament, it is to be understood that other methods may be employed without departing from the spirit and scope of this invention.

Referring to Figure 5, magnetic tape 31 having longitudinal remanent magnetism 32 thereon is shown traveling past a transducing device of the type described. A suitable longitudinal voltage 33 is applied between the ends of the filament 17. Thus, a longitudinal current flows through the filament 17. The emitter 26 has a voltage 34 applied thereto which causes an emitter current $I_e$ to flow. Holes are injected into the longitudinal electric field. The holes, which in effect may be represented by a positive charge, travel toward the negative terminal of the longitudinal voltage. The probe 28 is biased by voltage 35 to serve as a collector. Thus the holes are drawn towards the probe 28. Depending upon the intensity and polarity of the magnetic field across the filament, the holes are deflected towards and away from the probe point 28. Thus the current $I_c$ is proportional to the strength of the magnetic field. The voltage across the resistance 36 is proportional to the variations in the remanent magnetism on the recording medium. This voltage may then be applied to a suitable amplifying system which develops a voltage which is proportional to the original signal.

As illustrated in Figure 5, the semiconductor extends substantially perpendicular to the magnetic tape, and at right angles to the length of the tape. As the tape with its magnetic record passes the edge of the semiconductor, the extremely small increments of the record are adjacent the film at any given instance. Thus the thickness of the filament in the direction of the magnetic field determines the highest frequency which can be reproduced. Use of very thin filaments allows reproduction of relatively short wavelengths.

In Figures 6 through 10, I have shown other circuit connections to a filament of material which exhibits the "Suhl" effect. In all of these embodiments, magnetic concentration of holes and electrons is employed to give an output signal which is proportional to the remanent magnetism on the recording medium. Thus, an output signal is produced which is a function of the input signal to the recording head.

Figure 6:
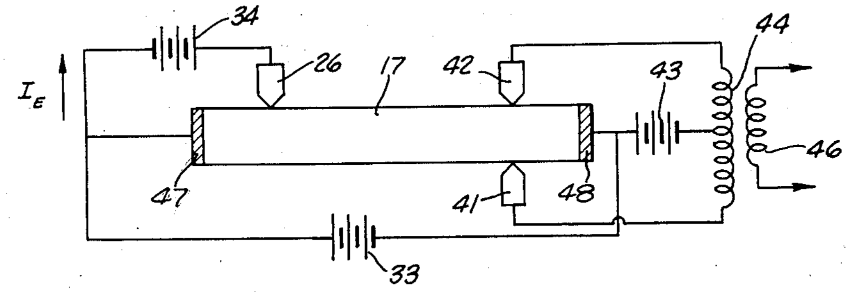

In Figure 6, a longitudinal voltage 33 is applied to the filament through ohmic connections of the type previously described. A positive voltage 34 causes an emitter current $I_e$ to flow into the filament at the contact 26. Two probe points 41 and 42 are placed on the opposite side of the filament. A positive potential is applied by suitable means to the probe points. For example, a battery 43 may be employed. The voltage is applied between the center tap of the windings 44 of the transformer and the probe points. Secondary windings 46 serve to connect the output signal to the associated equipment such as an amplifier. The contacts 47 and 48 may be of the collector type. The tape may pass either over the surface which includes the contact 43 or the surface which does not include any contacts. In the first instance, the signal will be a function of the longitudinal component of the magnetic field, while in the second instance the signal which is reproduced will be a function of the perpendicular component of the magnetic field.

The reproducing device shown provides a push-pull output. The signal which is produced by this circuit is considerably larger than the signal produced by the circuit shown in Figure 5. As the direction of the magnetic field changes, the holes are concentrated at one or the other of the two probes while on the opposite probe there is rarefaction. The secondary 46 of the transformer may be connected to an associated push-pull amplifier.

Figure 7:
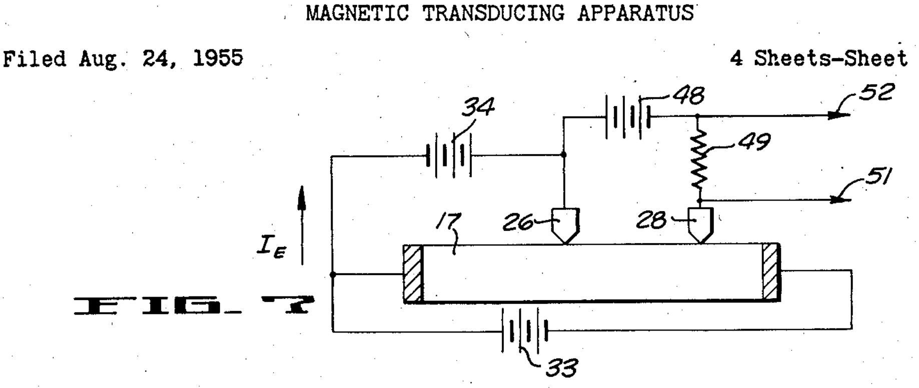

Figure 7 represents another embodiment of my invention. The longitudinal voltage 33 is applied to the filament 17 through the ohmic connections. A positive voltage 34 is applied to the emitter 26 to cause current to be injected into the longitudinal electric field. A suitable probe 28 is connected to one edge of the filament 17. A voltage 48 suitably biases the probe point 28. The resistor 49 is connected in series with the voltage source 48. Thus the current which flows due to the voltage 48 will vary as the conductivity between the probe points 26 and 28 varies. As previously pointed out the concentration of holes and electrons in the surface between the probes 26 and 28 will vary in accordance with the magnetic flux across the filament 17. The voltage variations appearing across the resistor 49 may then be taken off at terminals 51 and 52 and applied to a suitable amplifying system.

Figure 8:
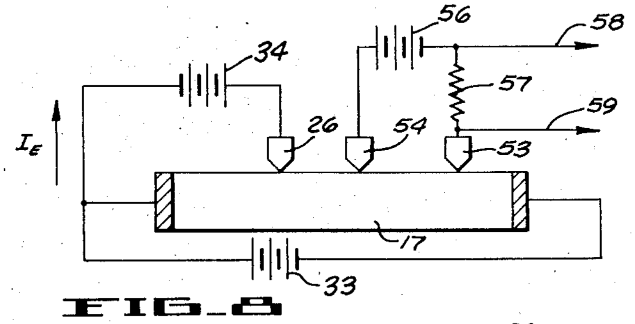

Referring to Figure 8, a device which makes use of the change in conductance between probe points is illustrated. Again, a longitudinal electric field is supplied by a longitudinal voltage 33. A suitable emitter current is supplied through the emitter connection 26 by a suitable voltage supply 34. A voltage 56 is applied between these two points in the series with a resistor 57. The conductance is measured between the points 53 and 54. As the conductance between the points 53 and 54 varies, the current flowing through the resistor 57 varies. The voltage of points 58 and 59 is a direct indication of the current variations. Since the conductance varies with the magnetic field, the voltage appearing across the points 58 and 59 may be amplified to give a signal which corresponds to the recorded signal.

Figure 9:
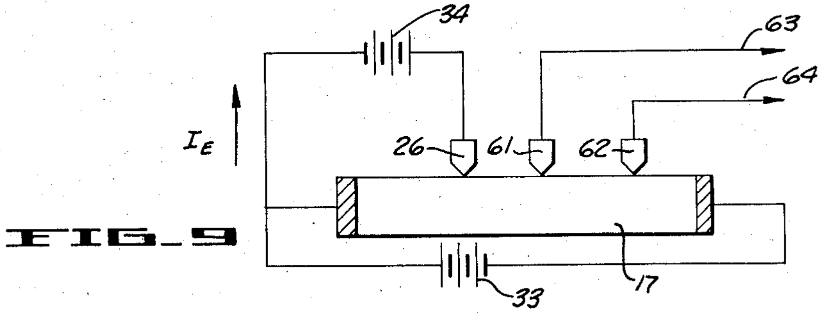

Referring to Figure 9, a filament 17 is shown with a suitable longitudinal voltage 33 and an emitter 26 which causes the emitter current $I_e$ to flow into the filament. The voltage drop between the probes 61 and 62 is applied to a suitable amplifier along the leads 63 and 64. The concentration of electrons and holes in the filament determines the conductance between the points 61 and 62. The voltage drop due to the longitudinal current flowing into the filament therefore varies in proportion to the change in conductances. Thus the voltage between the terminals 63 and 64 is a reproduction of the originally recorded signal.

Figure 10:
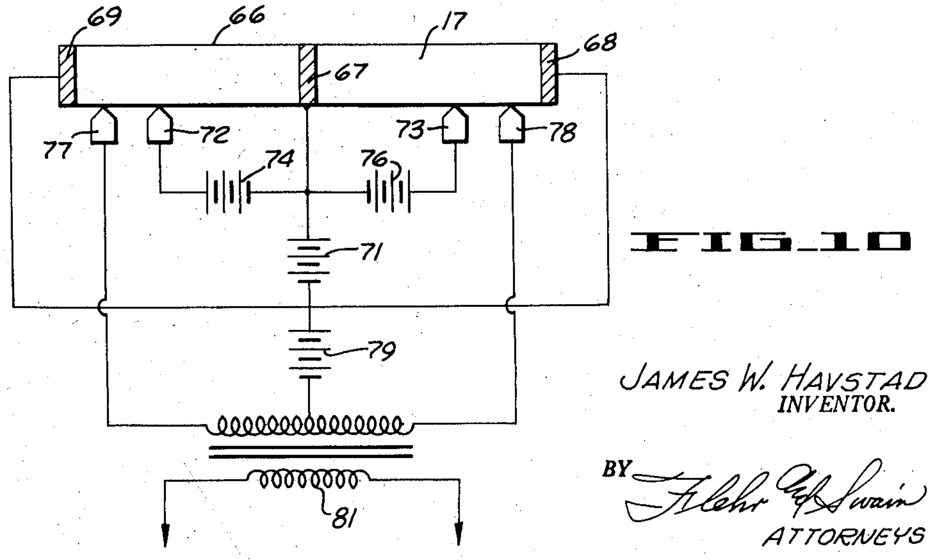

Referring to Figure 10, a transducing device which is suitable for driving a push-pull amplifier is shown. The magnetic tape passes along the face 66 of the filament. A suitable voltage is applied between the ohmic connection 67 and connections 68 and 69. The voltage which is represented by the battery 71 causes electron current to flow from the ohmic connection 67 to the ohmic connections 68 and 69, respectively. Emitter connections 72 and 73 provide means for injecting an emitter current into the electric field within the filament 17. These emitters are suitably biased, as, for example, by the batteries 74 and 76. Collector points or probes 77 and 78 are suitably biased, as, for example, by the battery 79. The change in the magnetic field across the filament will change a concentration of holes and electrons on the surface adjacent the probes 77 and 78 and consequently the current flow through the probes will change in accordance with the remanent magnetism on the magnetic tape. An output is produced at the secondary 81 of the transformer. This output may be used to drive a push-pull amplifier.

Referring to Figures 11 through 14, I have shown transducers of the type which are suitable for driving a push-pull amplifier. It is to be understood of course that although inductive loads are shown, resistive loads are interchangeable therewith and operation of the device will not change.

Figure 11:
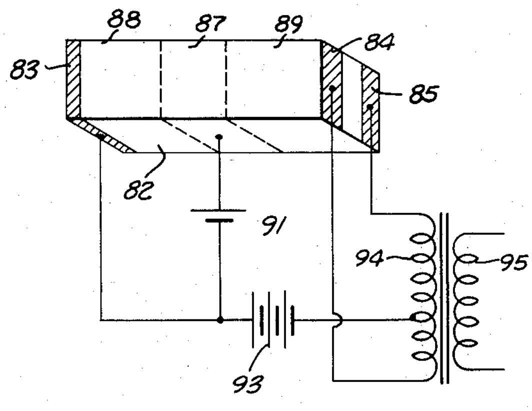

In Figure 11, a transducer 82 of n-p-n type comprising semiconducting material and having a divided collector is shown. A single ohmic connection 83 is made at one end and a pair of ohmic connections 84 and 85 are made at the other end. A p-type semiconductor region 87 which may be a grown junction is included between the n-type regions 88 and 89. A suitable bias voltage 91 is applied between the terminal 83 and the region 87 whereby electrons are injected into the transducer 82. A suitable longitudinal voltage 93 is applied between the ohmic connection 83 and the center tap of the primary transformer 94. The ends of the transformer are connected to the ohmic terminals 84 and 85. The output signal which is the same function of the recorded signal appears across the secondary of the transformer 95.

Figure 12:
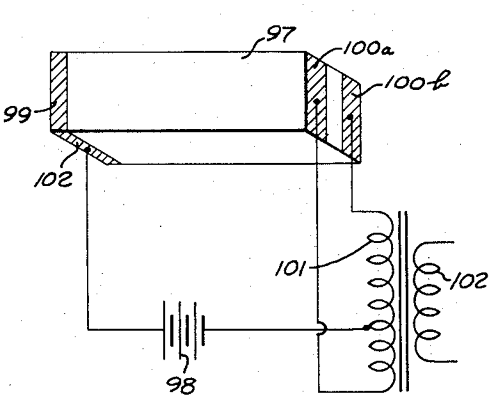

Referring to Figure 12, a filament 97 of the n-type semiconducting material has a longitudinal voltage 98 and is applied between the ohmic connection 99 and the center tap of the transformer primary 101. The ends of the transformer primary 101 are connected to the ohmic connections 100*a* and 100*b*. The terminal 102 has a gamma of 0.5, that is, an equal number of holes and electrons are injected at this terminal. The output signal which is a function of the remanent magnetism appears across the secondary 102 of the transformer.

Figure 13:
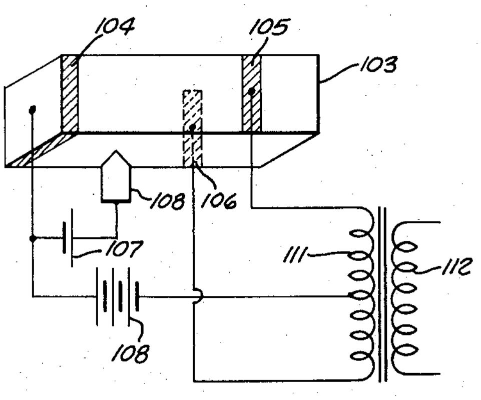

In Figure 13, I have shown another configuration which comprises a filament 103 which is provided with ohmic connections 104, 105 and 106. The voltage 107 suitably biases the emitter 108 whereby electrons are emitted. The longitudinal voltage 109 is applied between the ohmic connection 104 and the center tap of the transformer 111. The outside terminals of the transformer 111 are connected to the ohmic connections 105 and 106. The output signal which corresponds to the remanent magnetism of the tape passing over the filament appears across the secondary of the transformer 12.

Figure 14:
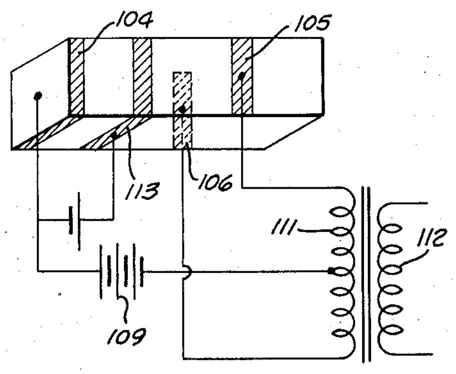

Referring to Figure 14, a transducer similar in configuration to that shown in Figure 13 is shown. The basic difference in this transducer is that the emitter, rather than being a point contact emitter 108, is a region of p-type semiconducting material 113. This region may be of the grown junction type.

Figure 15:
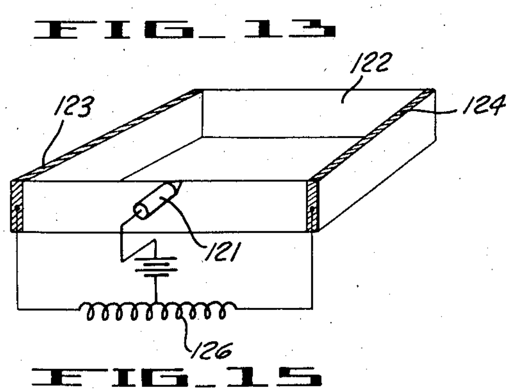

In Figure 15, I have shown another transducer in which the conductivity is modulated by the remanent magnetism of the magnetic tape. A point emitter 121 of low efficiency contacts the filament 122 at the upper border of one edge midway between the collectors 123 and 124. The tape traverses the filament longitudinally. The high density of charges immediately adjacent the emitter has a velocity component moving across the filament. The perpendicular component of magnetic field deflects the charges toward one of the other of the collectors 123 and 124. The inductive loading 126 develops an output signal. It is apparent that resistive rather than inductive loading may be employed. The sharply localized effective area allows high resolution.

Thus it is seen that magnetic concentration of holes and electrons by a magnetic field in a semiconductor is employed in the transducing device. This effect is generally referred to as the "Suhl" effect and many types of semiconducting materials exhibit the effect to varying degrees.

It is evident from the foregoing that my reproducing head is not subject to the same limitations as conventional magnetic reproducing heads. The zone through which the magnetic flux from the record track is effective is relatively thin, and is a small fraction of the zone through which the flux track is effective on conventional magnetic heads.

I claim:

1. Magnetic transducing apparatus of the type which serves to translate the remanent magnetism in a magnetic medium which moves relative thereto comprising, a filament of material in which electrons and holes may be concentrated by magnetic fields, said filament having one edge adapted to be disposed adjacent said magnetic medium having remanent magnetism whereby the magnetic field passes through said filament, means for applying an electric field along said filament, means for injecting carriers into said electric field, and means in contact with the other edge serving to develop a signal which varies in accordance with the changes in concentration of said carriers due to the remanent magnetic field along said medium.

2. Magnetic transducing apparatus which serves to translate remanent magnetism in a magnetic medium which moves relative thereto comprising, a filament of material in which the electrons and holes may be concentrated by a magnetic field, said filament having one edge adapted to be disposed adjacent said magnetic medium whereby the magnetic fields pass through said filament, ohmic connections disposed at the ends of said filament for applying a longitudinal electric field thereto, an emitter in contact with said filament and serving to inject holes into the filament and at least one probe connected to the other edge of said filament whereby the change in concentration of holes and electrons due to the magnetic field along the said magnetic medium serves to develop a signal having an amplitude and frequency corresponding to the remanent magnetism.

3. Apparatus as in claim 2 wherein at least two probes are connected along the edge of said filament whereby the change in concentration of holes and electrons due to the varying magnetic field gives rise to a voltage difference between the said probes.

4. Magnetic transducing apparatus which serves to translate remanent magnetism in a magnetic medium which moves relative thereto comprising, a filament of material in which the electrons and holes may be deflected by a magnetic field, said filament having one edge adapted to be disposed adjacent said magnetic medium whereby the magnetic fields pass through said filament, means for applying a longitudinal electric field thereto, means for injecting current carriers into the said electric field, and means connected to the other edge of said filament serving to develop a signal having amplitude and frequency which corresponds to the remanent magnetism.

5. Magnetic transducing apparatus which serves to translate remanent magnetism in a magnetic medium which moves relative thereto comprising, a filament of material which comprises n–p–n type semiconductor material in which the carriers may be concentrated by magnetic field, said filament having one edge adapted to be disposed adjacent said magnetic medium whereby the magnetic fields pass through said filament, means disposed along said filament for applying a longitudinal electric field thereto, means associated with said p-type portion for injecting current carriers into said electric field, and at least one connection to said filament whereby the change in concentration of carriers due to the magnetic field along said magnetic medium serves to develop a signal which varies in accordance with the remanent magnetism.

References Cited in the file of this patent

UNITED STATES PATENTS

| | | |
|---|---|---|
| 2,553,490 | Wallace | May 15, 1951 |
| 2,702,316 | Friend | Feb. 15, 1955 |
| 2,714,182 | Hewitt | July 26, 1955 |
| 2,736,822 | Dunlap | Feb. 28, 1956 |